United States Patent [19]
Hiroki

[11] Patent Number: 6,055,445
[45] Date of Patent: *Apr. 25, 2000

[54] WIRELESS COMMUNICATION APPARATUS AND INDICATION CONTROL METHOD THEREFOR

[75] Inventor: Shigeru Hiroki, Hiratsuka, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/550,834

[22] Filed: Oct. 31, 1995

[30] Foreign Application Priority Data

Nov. 1, 1994 [JP] Japan ................... 6-268870

[51] Int. Cl.⁷ ................................ H04Q 7/20
[52] U.S. Cl. .................. 455/566; 455/403; 455/573; 379/164; 379/396
[58] Field of Search ................ 379/58, 61, 62, 379/156, 164, 376, 377, 383, 396; 455/54.1, 403, 422, 462, 517, 566, 567, 572, 573, 38.3, 343, 463

[56] References Cited

U.S. PATENT DOCUMENTS

| | | | |
|---|---|---|---|
| 4,517,409 | 5/1985 | Nagasaki | 379/156 |
| 4,538,028 | 8/1985 | Gazzoli et al. | 379/61 |
| 4,768,218 | 8/1988 | Yorita | 379/61 |
| 5,123,042 | 6/1992 | Saegusa et al. | 379/61 |
| 5,218,628 | 6/1993 | Ito | 379/58 |
| 5,239,572 | 8/1993 | Saegusa et al. | 379/61 |
| 5,251,250 | 10/1993 | Obata et al. | 455/415 |
| 5,381,468 | 1/1995 | Ozawa . | |
| 5,517,551 | 5/1996 | Arai | 379/58 |
| 5,559,861 | 9/1996 | Takehisa | 379/58 |

OTHER PUBLICATIONS

U.S. application No. 08/141,475, filed Oct. 22, 1993.
U.S. application No. 08/147,400, filed Nov. 5, 1993.
U.S. application No. 08/261,620, filed Jun. 17, 1994.

*Primary Examiner*—Dwayne D. Bost
*Assistant Examiner*—Nay A. Maung
*Attorney, Agent, or Firm*—Morgan & Finnegan, L.L.P.

[57] ABSTRACT

A wireless communication apparatus in which a main unit transmits an external-line status message corresponding to status of an external line, to a portable telephone via a connection unit when the status has changed. The portable telephone indicates the status of the external line by an external-line LED if the telephone is in an indication mode, based on the received external-line status message. However, if the telephone is in a no-indication mode, the telephone stores the received external-line status message into a RAM. Thereafter, if the no-indication mode has changed to the indication mode, the telephone displays the status of the external line by the external-line LED, based on the stored external-line status message.

69 Claims, 15 Drawing Sheets

FIG. 4

| STATUS OF EXTERNAL-LINE 205 | INDICATION OF EXTERNAL-LINE LED |
|---|---|
| AVAILABLE | UNLIT |
| I-USE CONDITION | STEADY LIT IN GREEN |
| USED BY OTHER TELEPHONES | STEADY LIT IN RED |
| LINE IS BEING CALLED | FAST FLASHING IN RED |
| I-HOLD CONDITION | SLOW FLASHING IN GREEN |
| HELD BY OTHER TELEPHONES | SLOW FLASHING IN RED |

FIG. 5

| MESSAGE LENGTH | MESSAGE IDENTIFIER (= INFORMATION ON EXTERNAL-LINE STATUS) | STATUS OF EXTERNAL LINE a (AVAILABLE) | STATUS OF EXTERNAL LINE b (LINE IS USED BY OTHER TELEPHONES) | STATUS OF EXTERNAL LINE c (AVAILABLE) | STATUS OF EXTERNAL LINE d (LINE IS HELD BY OTHER TELEPHONES) |
|---|---|---|---|---|---|

501

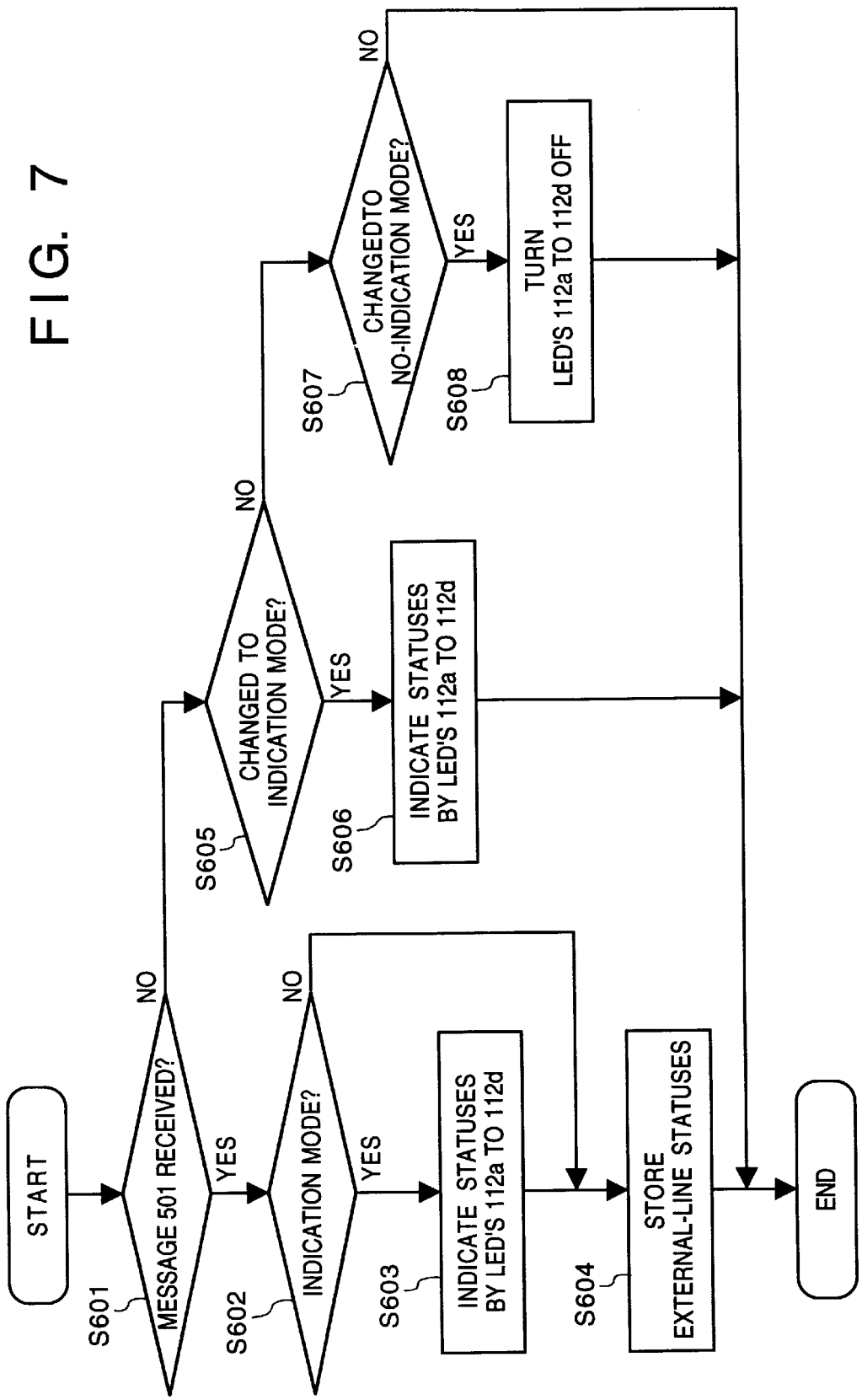

FIG. 8

| COMMUNICATION STATUS | LOCATION OF PORTABLE TELEPHONE WITH RESPECT TO BATTERY CHARGER | DISPLAY MODE |
|---|---|---|
| AVAILABLE | ON BATTERY CHARGER | EXTERNAL-LINE STATUS INDICATION MODE |
| | OUT OF BATTERY CHARGER | EXTERNAL-LINE STATUS NO-INDICATION MODE |
| ORIGINATING A CALL | OUT OF BATTERY CHARGER | EXTERNAL-LINE STATUS INDICATION MODE |
| IN COMMUNICATION | OUT OF BATTERY CHARGER | EXTERNAL-LINE STATUS NO-INDICATION MODE |
| BEING CALLED | ON BATTERY CHARGER | EXTERNAL-LINE STATUS INDICATION MODE |
| | OUT OF BATTERY CHARGER | EXTERNAL-LINE STATUS INDICATION MODE |
| ON HOLD | ON BATTERY CHARGER | EXTERNAL-LINE STATUS INDICATION MODE |
| | OUT OF BATTERY CHARGER | EXTERNAL-LINE STATUS NO-INDICATION MODE |

FIG. 12

| MESSAGE LENGTH | MESSAGE IDENTIFIER (= EXTERNAL-LINE STATUS INFORMATION) | STATUS OF EXTERNAL LINE (AVAILABLE / BUSY) |
|---|---|---|

1101

WIRELESS COMMUNICATION APPARATUS AND INDICATION CONTROL METHOD THEREFOR

BACKGROUND OF THE INVENTION

This invention relates to a wireless communication apparatus and indication control method for the apparatus.

In a conventional wireless communication apparatus, such as a key telephone apparatus comprising a main unit which accommodates at least one external line, a connection unit connected to extension side of the main unit and a portable telephone for performing wireless communication with the connection unit, the status of the external line(s) connected to the main unit is displayed at the portable telephone.

External-line LED indications of the above-mentioned conventional apparatus will be described below.

In the conventional key telephone apparatus, when any external line status changes, the main unit transmits an external-line status message 501 shown in FIG. 5, including the statuses of these external lines (hereinafter referred to as lines a to d), to the portable telephone via the connection unit. The portable telephone which has received the external-line status message 501 from the main unit, indicates the external line statuses by external-line LED's (hereinafter referred to as LED's a' to d') based on the external-line status message.

As this type of portable telephone for enabling communication while moving, uses a portable battery as power source. The telephone deactivates the external-line LED's for the sake of saving the battery power, if indications are not required.

In a case where the portable telephone is placed on a battery charger, it is not necessary to consider electric consumption of the batteries. For this reason, when the telephone placed on the charger receives an external-line status message from the main unit, the external-line statuses indicated by the external-line LED based on the message. In a case where the portable telephone is not placed on the battery charger and the telephone is not in communication status (i.e., the telephone is not used), external-line LED's are inactivated because LED indications do not take effect in this case. That is, to save electric consumption of the batteries, the telephone does not activate the external-line LED's even when it has received an external-line status message from the main unit.

However, in the conventional key telephone apparatus, when an END key of the portable telephone is pressed to quit communication and the portable telephone is placed on the battery charger after some interval, it operates as follows.

The external-line LED's a to d are all turned off at a moment the END key is pressed, and thereafter, even the portable telephone is placed on the battery charger, the telephone does not activate the external-line LED's until an external line status changes and an external-line status message from the main unit is received. This is inconvenient for a user of the portable telephone. It should be noted that FIG. 15 is a the sequence chart of operation provided by the conventional key telephone apparatus.

SUMMARY OF THE INVENTION

Accordingly, an object of the present invention is to provide a wireless communication apparatus that quickly displays current external-line status(es) if the wireless communication apparatus is in a mode to indicate external-line status(es).

According to the present invention, the foregoing object is attained by providing a wireless communication apparatus which performs wireless communication with a fixed device to which an external line is connected, comprising:

reception means for receiving a wireless signal indicative of status of the external line status, the wireless signal being transmitted corresponding to a timing when the status changes;

memory means for storing the status of the external line based on the wireless signal received by the reception means;

indication means for indicating the status of the external line in an indication mode of the status; and control means for, when a no-indication mode in which the status is not indicated has changed to the indication mode, controlling the indication means so as to indicate the status of the external line stored in the memory means.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is an explanatory view showing the correlation between an external-line LED 112 and an external line 205;

FIG. 5 is an explanatory view showing the data format of external-line status message 501;

FIG. 7 is a flowchart showing the operation of the portable telephone controller according to the first embodiment;

FIG. 8 is an explanatory view showing the relationship between "communication status", "location of a portable telephone with respect to battery charger" and "display mode";

FIG. 12 is an explanatory view showing the data format of external-line status message 1101;

DETAILED DESCRIPTION OF THE PREFERRED EMBODIMENTS

Preferred embodiments of the present invention will now be described in detail in accordance with the accompanying drawings.

First Embodiment

Figure 1:
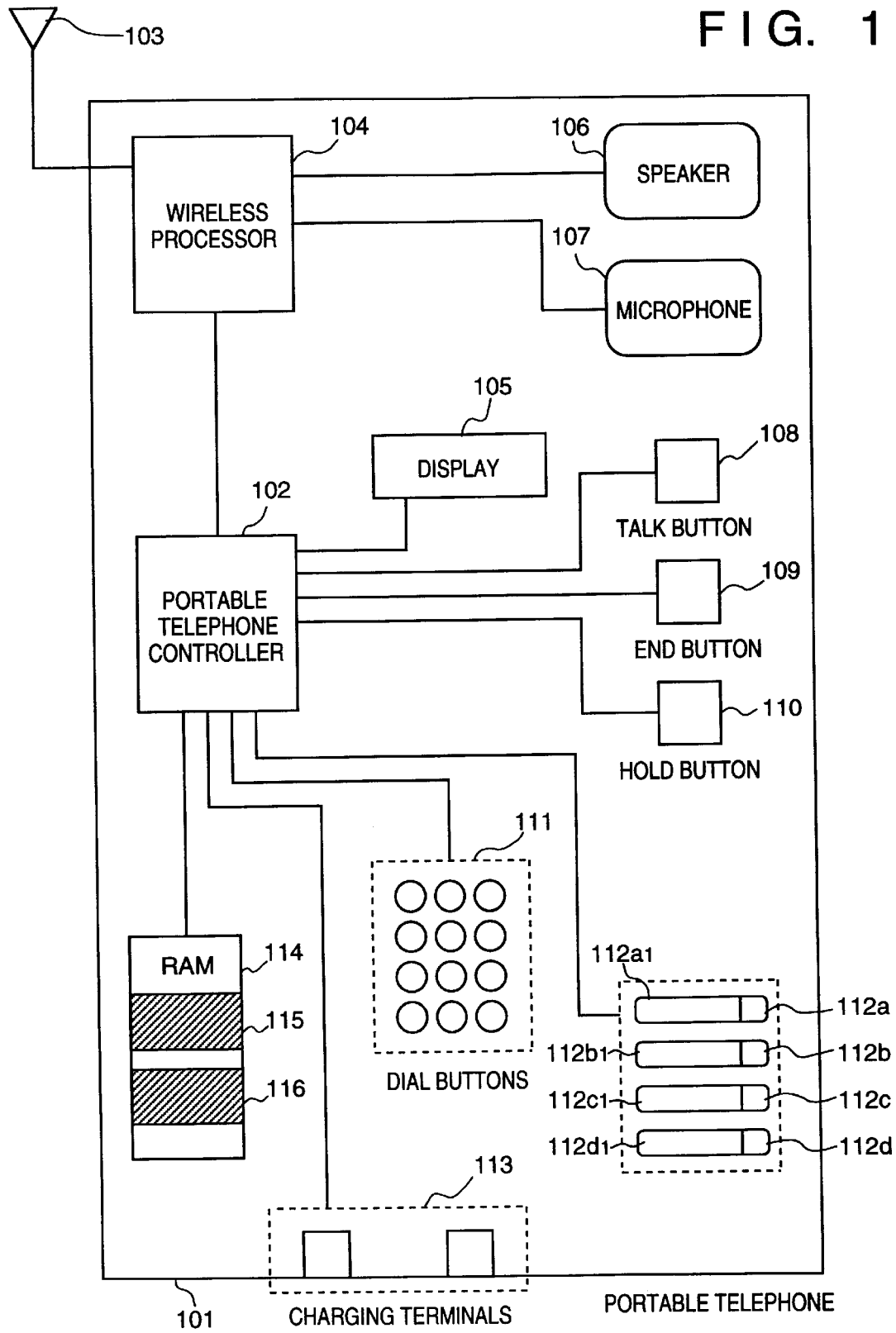
FIG. 1 is a block diagram showing a portable telephone 101 of a key telephone apparatus according to a first embodiment of the present invention.

FIG. 1 is a block diagram showing the construction of a portable telephone of a key telephone apparatus according to a first embodiment of the present invention.

Figure 2:
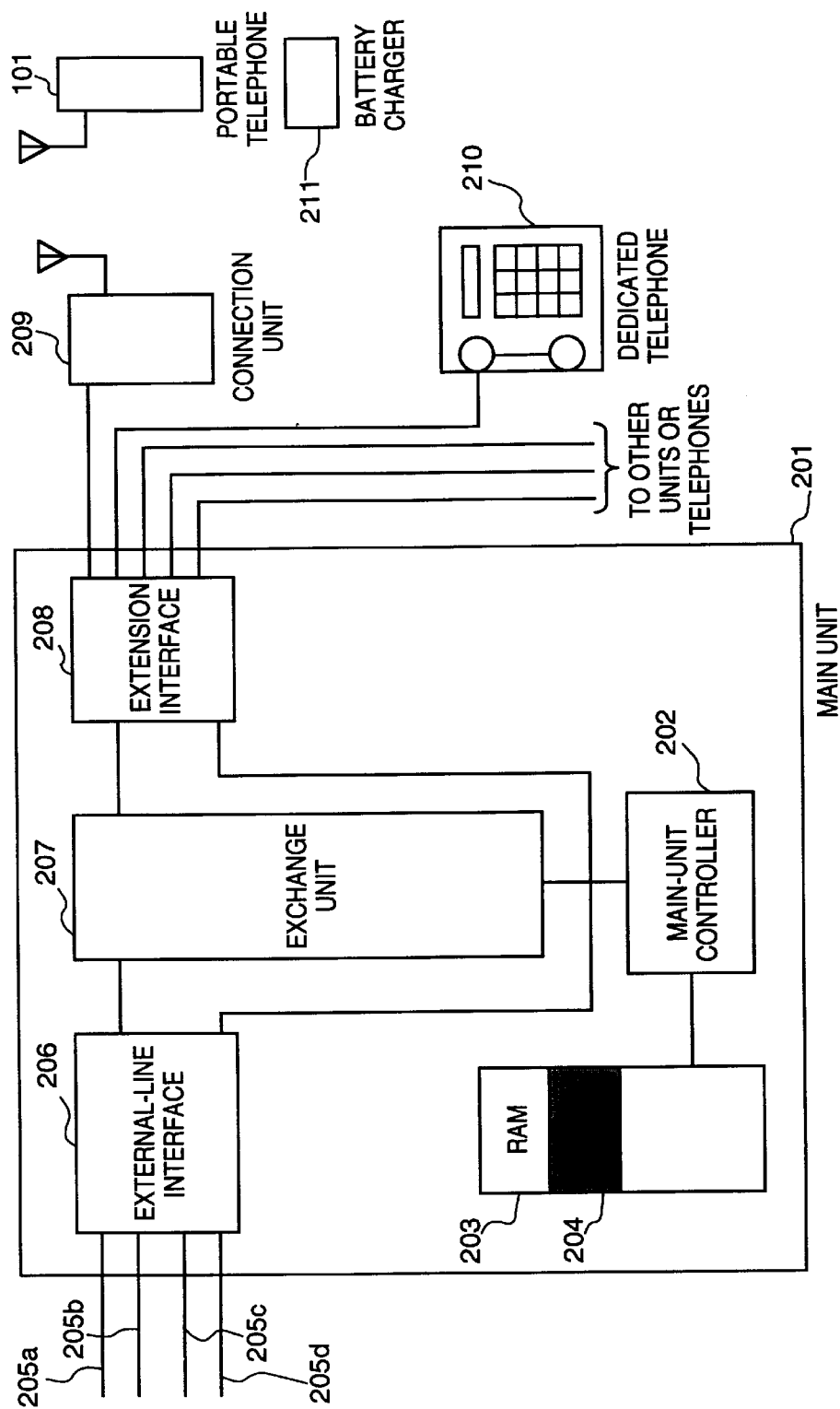
FIG. 2 is a block diagram showing the construction of the key telephone apparatus.

Reference numeral 102 denotes a portable-telephone controller for controlling the portable telephone 101; 103, an antenna; 104, a wireless processor; 105, a display for displaying dialed numbers and the like; 106, a speaker; 107, a microphone; 108, a TALK button to start communication; 109, an END button to stop communication; 110, a HOLD button to hold communication; 111, dial buttons for inputting telephone numbers; and 112a to 112d, external-line LED's respectively indicating the statuses of external lines 205a to 205d (FIG. 2). The external-line keys 112a1 to 112d1 are located next to the external-line LED's 112a to 112d, respectively, for selecting the external lines 205a to 205d. Numeral 113 denotes charging terminals to be connected to a battery charger 211 (FIG. 2) to charge the battery of the portable telephone 101; 114, a RAM used as a storage medium of the portable telephone 101; 115, a mode storage area indicative of whether mode stored in the RAM 114 is "external-line status indication mode" or "external-line status no-indication mode"; and 116, storage area for external-line statuses in which statuses of external lines 205a to 205d are stored.

FIG. 2 is a block diagram showing the construction of the key telephone apparatus of the present embodiment. In FIG. 2, numeral 201 denotes a main unit of the key telephone apparatus; 202, a main-unit controller for controlling the main unit 201; 203, a RAM used as a storage medium of the main unit 201; 204, a storage area, for storing statuses of the external lines 205a to 205d (hereinafter, desired one of the external lines 205a to 205d is referred to as external line 205); 206, an external-line interface between the external line 205 and the main unit 201; 207, an exchange unit; 208, an extension interface for accommodating extensions to the main unit 201; 209, a connection unit connected to the main unit 201 via the extension interface 208, for performing wireless communication with the portable telephone 101; 210, a dedicated telephone connected to the main unit 201 via the extension interface 208; 101, the portable telephone that performs wireless communication with the connection unit 209; and 211, the battery charger on which the portable telephone 101 is placed to charge the built-in battery.

Note that FIG. 2 shows only one portable telephone 1, one connection unit 209, one dedicated telephone 210, and one battery charger 211, however, a plurality of portable telephones 1, connection units 209, dedicated telephones and battery chargers may be connected. Further, the dedicated telephone 210 may be omitted.

Figure 3:
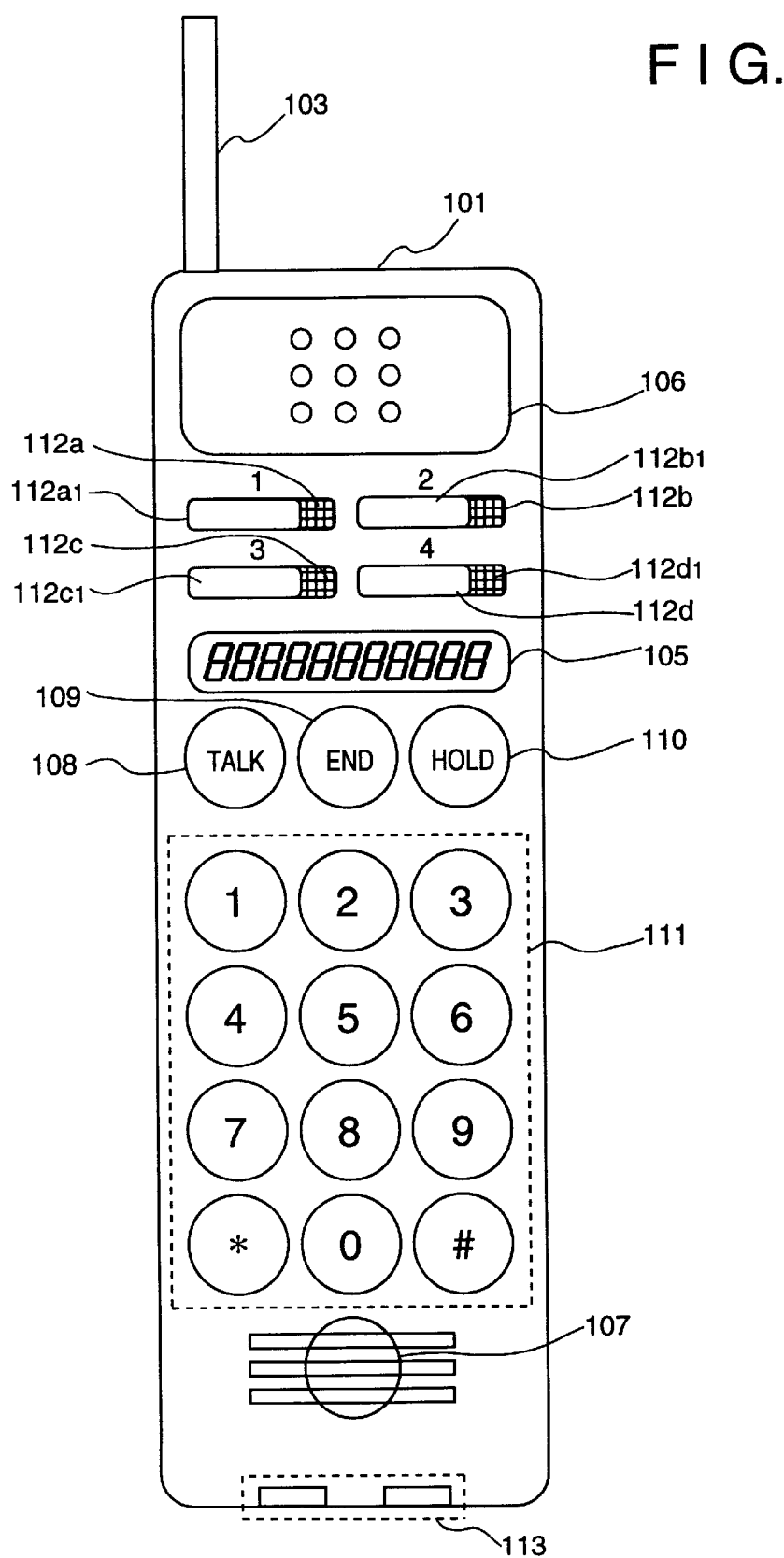
FIG. 3 is an overview of the portable telephone 101 which displays external line status(es)

FIG. 3 is an overview of the portable telephone 101, explaining indication of external-line status. In FIG. 3, as shown in FIG. 2, numeral 103 denotes an antenna; 105, a display for displaying dialed numbers and the like; 106, a speaker; 107, a microphone; 108, a TALK button; 109, an END button to quit communication; 110, a HOLD button; 111, dial buttons for inputting telephone numbers; 112a to 112d, external-line LED's for indicating statuses of the external lines 205a to 205d; 112a1 to 112d1, external-line keys for selecting the external-lines 205a to 205d; and 113, charging terminals to be connected to the battery charger 211, to charge the battery of the portable telephone 101.

FIG. 4 shows the correlation between indications of the external-line LED's and statuses of the external-line 205. As shown in FIG. 4, each of the external-line LED's has a two-color LED, red and green. The external-line status is indicated by a combination of steady lit, unlit, fast flashing and slow flashing, in red and green.

FIG. 5 shows the data format of the external-line status message 501. Note that the external-line status message 501 may include all statuses of all the external lines 205a to 205d, or may include only the status of the external line that has been changed.

When status of the external-line 205 changes, the main unit 201 transmits the external-line status message 501 to the portable telephone 101 via the connection unit 209. For example, when a user of the dedicated telephone 210, who has been performing communication using the external line 205a, quits the communication, the external line 205a becomes available. Then the main unit 201 transmits the external-line status message 501, including information indicating that the external line 205a is available, to the portable telephone 101.

Figure 6:
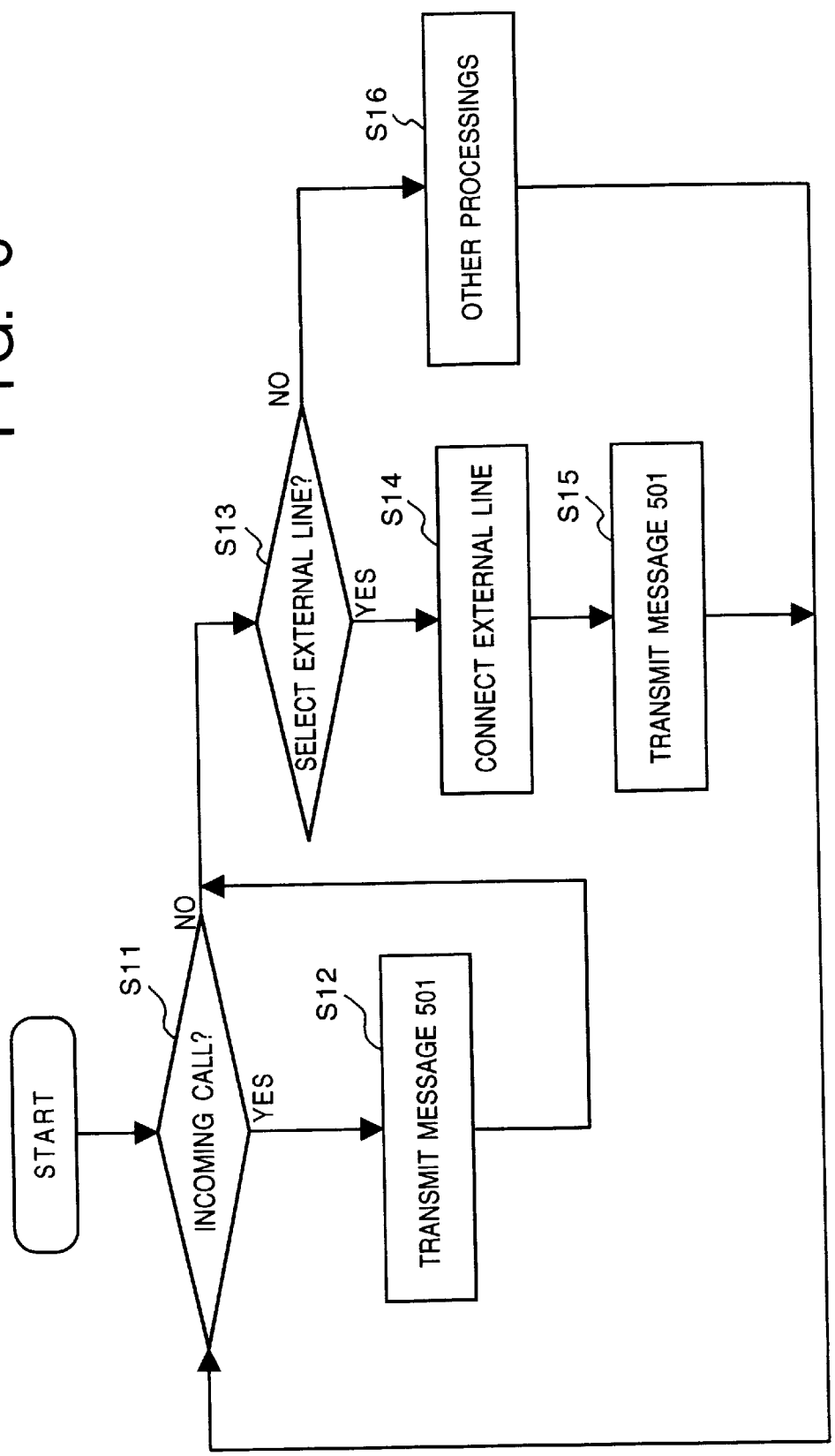
FIG. 6 is a flowchart showing the operation of main unit according to the first embodiment.

The operation of the main unit 201 will be described with reference to FIG. 6.

When the external-line interface 206 informs the main-unit controller 202 that one of the external lines 205a to 205d has an incoming call on it (S11), the main-unit controller 202 stores a status in the storage area for storing external-line statuses that one of the external-lines 205a to 205d has the incoming. Then, the main-unit controller 202 transmits the external-line status message 501, including the information indicating that the one of the external lines 205a to 205d has the incoming call, to the portable telephone 101 and the dedicated telephone 210 (S12).

When one of the external lines 205a to 205d is selected by depressing corresponding external-line keys 112a1 to 112d1 at the portable telephone 101 or the dedicated telephone 210 (S13), the main-unit controller 202 stores a status in the storage area 204 for storing the external-line status, that one of the external lines 205a to 205d is being used by a telephone which has performed a line selection operation. The controller 202 then connects the selected external line to the telephone (S14). After that, the main-unit controller 202 transmits the external-line status message 501 to the telephone, including information indicating that one of the external lines 205a to 205d is in an I-use condition at the telephone. While, to a telephone that has not performed the line selection operation, the external-line status message 501 is transmitted, including information indicating that one of the external lines 205a to 205d is being used by other telephones (S15)

The line selection operation at step S13 corresponds to operation to answer an incoming call if one of the external lines 205a to 205d has the incoming call on it, to operation to answer a held line, if the line is in a holding-status, and to operation to originate a call if the line is available.

Note that other processings at step S16 include processing when a calling party abandons a call before the call is responded; and processing when a telephone user who is in communication using one of the external lines 205a to 205d performs on-hook operation or puts the communication on hold.

If the incoming call at step S11 is terminated before the telephone 101 or 210 respond to it at step S13 (i.e., a call originator has abandoned the call), the main-unit controller 202 stores a status of an external line in the storage area 204 for storing the external-line, indicating that the external line is available. The controller 202 also transmits the external-line status message 501 to the telephones 101 and 210, including information indicative of availability of the external line.

At step S13, if the telephone 101 or 210 goes on-hook while it is in communication via the selected one of the external lines 205a to 205d, the main-unit controller 202 stores a status in the storage area 204 for storing external-line status, indicating that the selected external line has become available. The controller 202 also transmits the external-line status message 501 to the telephones 101 and 210, including information indicating that the selected external line is available.

In a case where the telephone 101 or 210 which is in communication via one of the external lines 205a to 205d holds a line, the main-unit controller 202 stores a status in the storage area 204 for storing the external-line status, indicating that the external line is in an I-hold condition at the telephone. The controller 202 then transmits the external-line status message 501 to the telephone 101 or 210, including information indicating that one of the external lines 205a to 205d is held by the telephone 101 or 210. Further, to the other telephones, the main-unit controller 202 transmits the external-line status message 501, including information indicating that one of the external lines 205a to 205d is held by the telephone 101 or 210.

FIG. 7 is a flowchart showing the operation, especially the control of LED indications of the portable telephone controller according to the first embodiment.

When the portable telephone 101 receives the external-line status message 501 from the main unit 201 ("YES" at step S601), the portable-telephone controller 102 determines the current display mode stored in the mode storage area 115 (S602). If the mode is the external-status indication mode, the external-line statuses are indicated by the external-line LED's 112a to 112d (S603) based on the external-line statuses contained in the external-line status message 501. Then, the external-line statuses are stored into the external-line status storage area 116 (S604). In a case where the portable telephone 101 receives the external-line status message 501 and the current display mode is external-line status no-indication mode ("NO" at step S602), the external-line statuses contained in the external-line status message 501 are stored into the external-line status storage area 116 (S604).

On the other hand, even when the portable telephone 101 does not receive the external-line status message at step S601, the mode stored in the mode storage area 115 is examined whether it has changed to the external-line status indication mode (S605). If YES is rendered at step S605, the controller 102 performs indication of the external-line statuses by the external-line LED's 112a to 112d (S606), based on the external-line statuses stored in the external-line status storage area 116. When the mode stored in the mode storage area 115 has changed to the external-line status no-indication mode ("YES" at step S607), all the external-line LED's 112a to 112d are turned off (S608).

FIG. 8 shows the relationship between "communication status", "location of a portable telephone with respect to battery charger" and "display mode". According to FIG. 8, the apparatus of the present embodiment allows a mode change from the external-line status no-indication mode to the external-line status indication mode in the following cases:

1. the END button 109 is pressed to quit communication and the portable telephone 101 is placed on the battery charger 211.
2. the portable telephone 101 is placed on the battery charger 211 while communication is in progress, then the communication is terminated.
3. the HOLD button 110 is pressed to hold communication and the portable telephone 101 is placed on the battery charger 211.
4. one of the external-line keys 112a1 to 112d1 is pressed when the portable telephone 101 is not on the battery charger 211.
5. a call comes when the portable telephone 101 is not placed on the charger 211.

Figure 9:
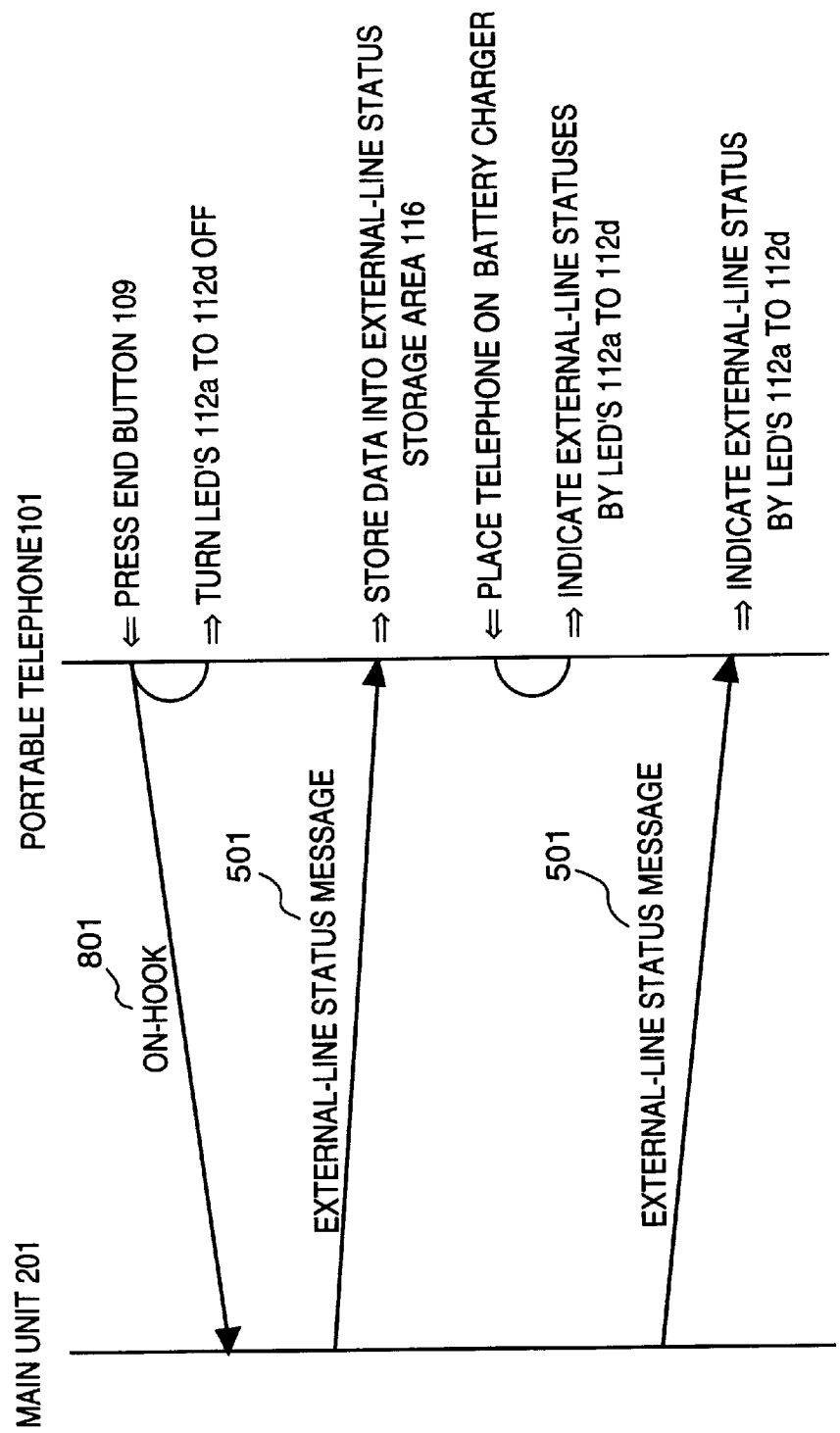
FIG. 9 is a sequence chart showing communication between a main unit 201 and the portable telephone 101.

FIG. 9 is a sequence chart showing communication between the main unit 201 and the portable telephone 101 in the case 1 mentioned above.

According to the control of LED indications mentioned above, it is possible for the portable telephone 101 to indicate the external-line statuses by the external-line LED's without intervention when the mode is changed from the external-line status no-indication mode where all the external-line LED's 112 are turned off, to the external-line status indication mode. As a result of this control, in the external-line status indication mode, a user of the portable telephone 101 can invariably recognize the statuses of the external lines.

Second Embodiment

Figure 10:
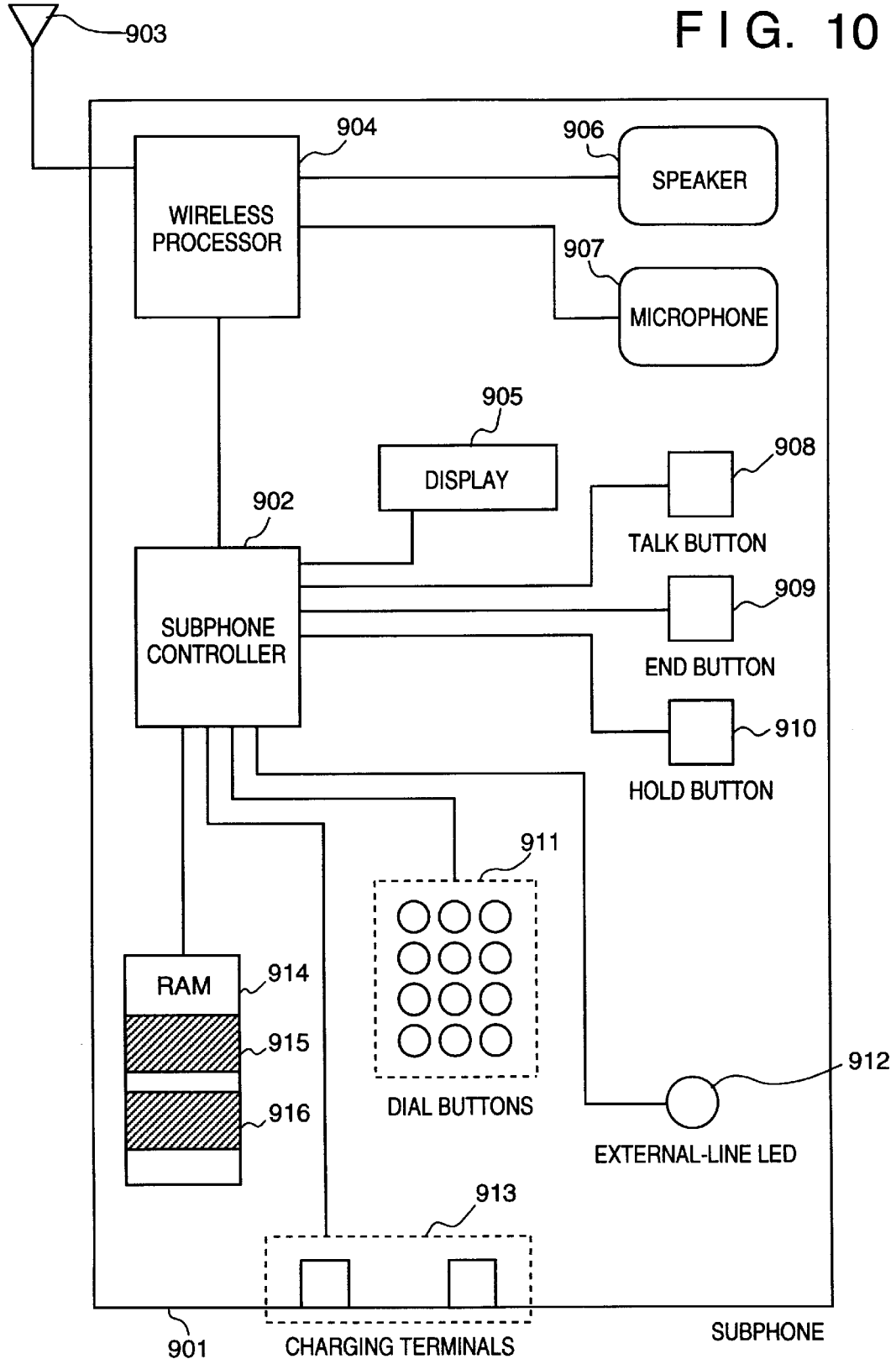
FIG. 10 is a block diagram showing the construction of a subphone 901 of a cordless telephone apparatus according to a second embodiment of the present invention.

FIG. 10 is a block diagram showing the construction of a portable subphone of a cordless telephone apparatus according to a second embodiment of the present invention.

Figure 11:
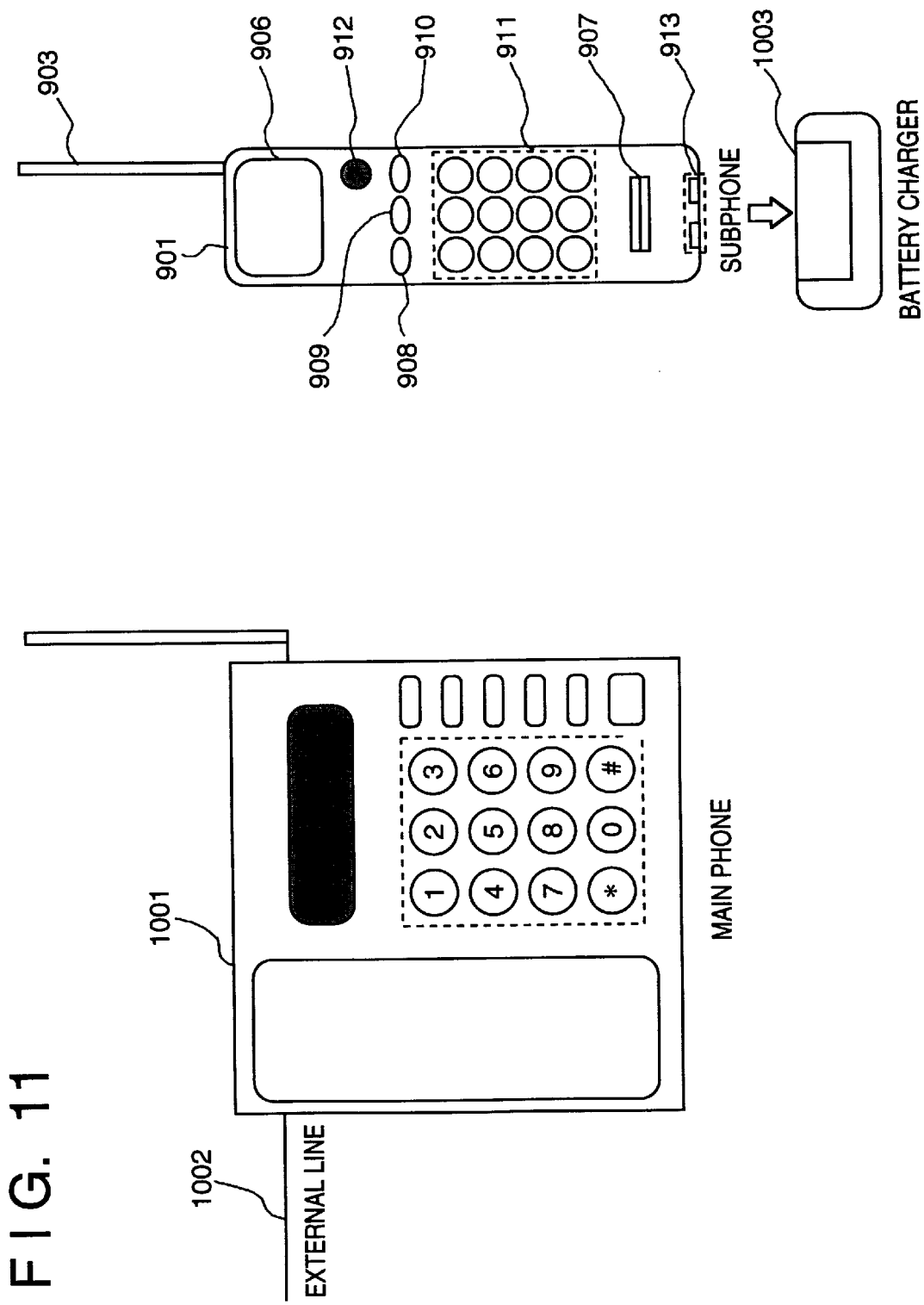
FIG. 11 is an overview of the cordless telephone apparatus of the second embodiment.

Numeral 902 denotes a subphone controller for controlling a portable subphone 901; 903, an antenna; 904, a wireless processor; 905, a display for displaying input telephone number and the like; 906, a speaker; 907, a microphone; 908, a TALK button to start communication; 909, an END button to quit communication; 910, a HOLD button to hold communication; 911, dial buttons to input telephone numbers; 912, an external-line LED to indicate status of an external line 1002 shown in FIG. 11; 913, a charging terminals to connect the portable subphone 901 to a battery charger 1003 (FIG. 11) to charge a battery of the portable subphone 901; 914, a RAM as a storage medium of the portable subphone 901; 915, a mode storage area to indicate whether a mode stored in the RAM 914 is "external-line status indication mode" or "external-line status no-indication mode"; and 916, an external-line status storage area of the RAM 914, for storing status of the external line 1002.

FIG. 11 is an overview of the overall cordless telephone apparatus. Numeral 1001 denotes a main phone of the apparatus; 1002, an external line; 1003, a battery charger on which the portable subphone 901 is placed to charge the built-in battery.

At the portable subphone 901, the external-line LED 912 is illuminated in red and green. The external-line status when the main phone 1001 uses the external line 1002 is indicated by the LED 912 which is steady lit in red, while the LED 912 is steady lit in green when the main phone 1001 does not use the external line 1002.

When the main phone 1001 quits communication on the external line 1002, or when the main phone 1001 starts communication using the external line 1002, the main phone 1001 transmits an external-line status message 1101, including the status of the external line 1002, to the portable subphone 901.

FIG. 12 is an example of data format of the external-line status message 1101. "Status of external line" shown in FIG. 12 is indicated by either "a line is used by main-phone" or "main-phone is not using a line".

Figure 13:
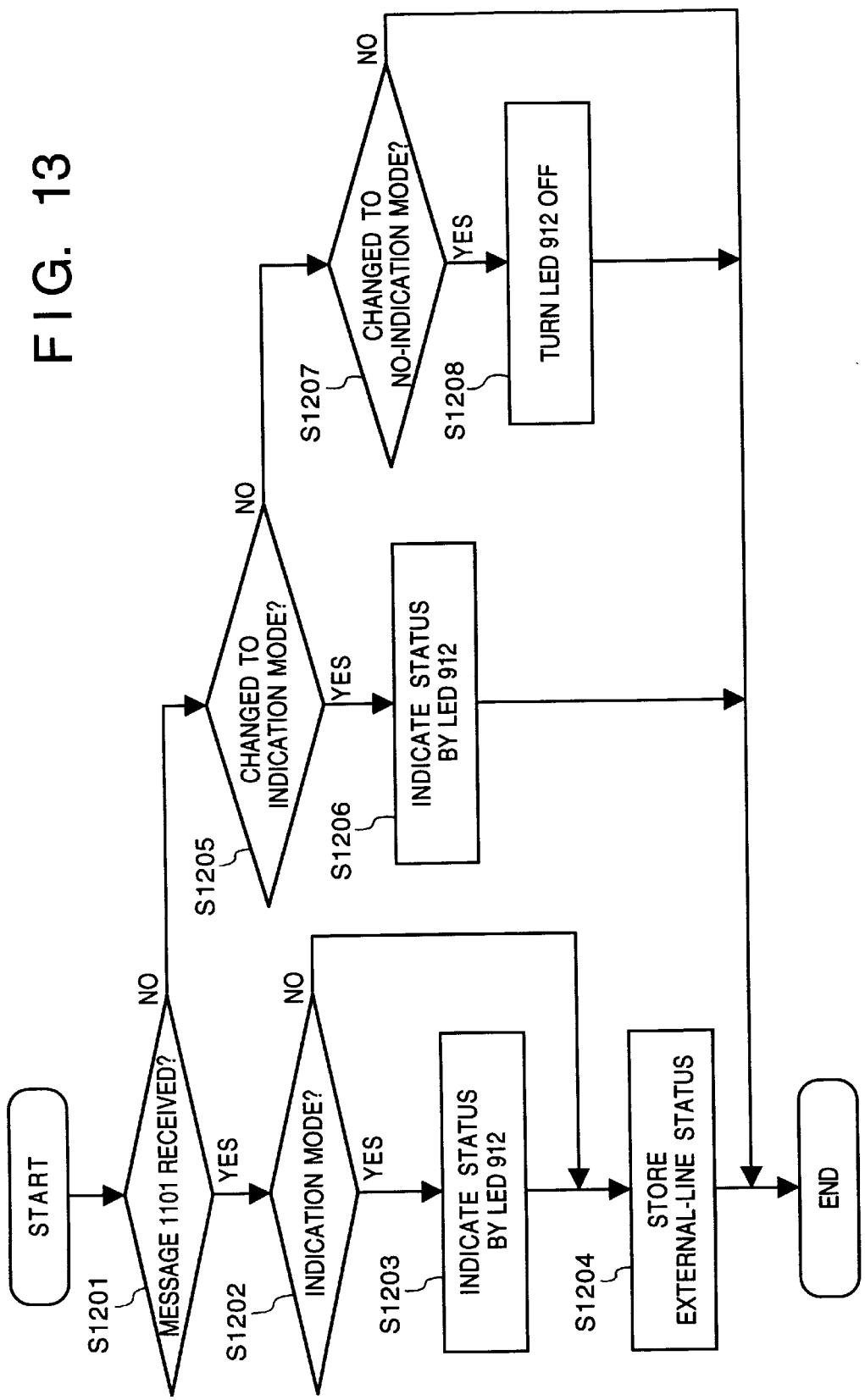
FIG. 13 is a flowchart showing control processing of LED indications of the cordless telephone apparatus according to the second embodiment.

FIG. 13 is a flowchart showing the operation of the portable telephone controller according to the second embodiment.

As the external-line status message is received from the main phone 1001 ("YES" at step S1201), the subphone controller 902 determines current mode stored in the mode storage area 915 (S1202). If the mode is the external-line status indication mode, the subphone controller 902 indicates the external-line status by the external-line LED 912 (S1203) based on a status indicated by the external-line status message 1101, and stores the external-line status into the external-line status storage area 916 (S1204). Further, when the external-line status message 1101 is received and the mode is the external-line status no-indication mode, the subphone controller 902 stores the external-line status indicated by the external-line status message 1101 into the external-line status storage area 916 (S1204).

At the subphone 901, when the mode stored in the mode storage area 915 has changed from the external-line no-indication mode to the external-line indication mode ("YES" at step S1205), the subphone controller 902 indicates the external-line status by the external-line LED 912 (S1206), based on the external-line status stored in the external-line status storage area 916. If the mode stored in the mode storage area 915 has changed from the external-line indication mode to the external-line no-indication mode ("YES" at step S1207), the external-line LED 912 is turned off (S1208).

It should be noted that the relation among "communication status", "relation between subphone and battery charger" and "mode" is the same as that in FIG. 8 that the apparatus of the present embodiment allows change from the external-line status hide mode to the external-line status display mode in the following cases:

1. the END button 909 is pressed to terminate communication and the subphone 901 is placed on the battery charger 1003.
2. the subphone 901 is placed on the battery charger 1003 while communication is in progress, then the communication is terminated.
3. the HOLD button 910 is pressed to hold the communication and the subphone 901 is placed on the battery charger 1003.
4. the TALK button 908 is pressed when the subphone 901 is not on the battery charger 1003.
5. a call comes when the subphone 901 is out of the battery charger 1003.

Figure 14:
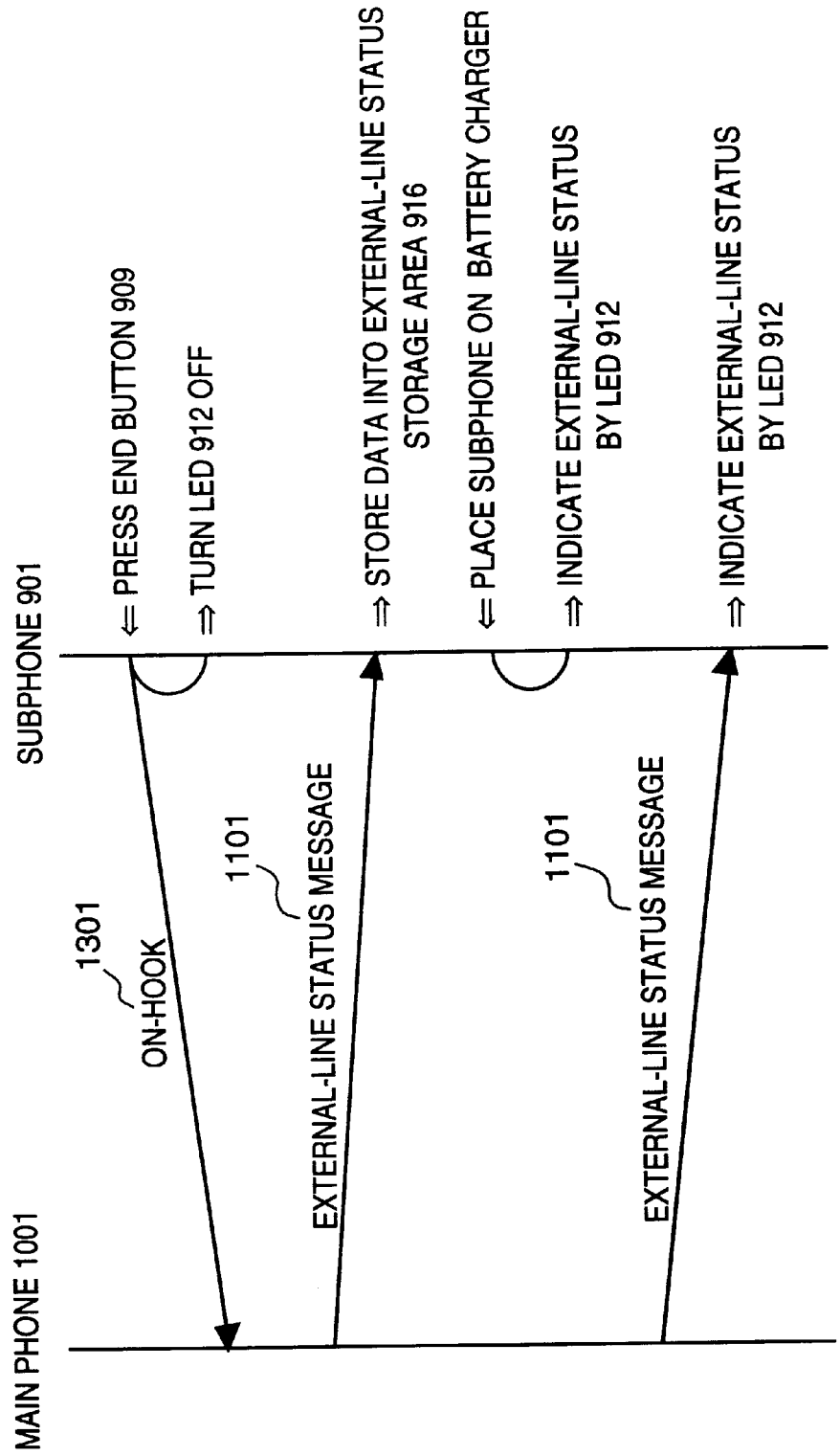
FIG. 14 is a sequence chart showing communication between a main phone 1001 and the subphone 901.
Figure 15:
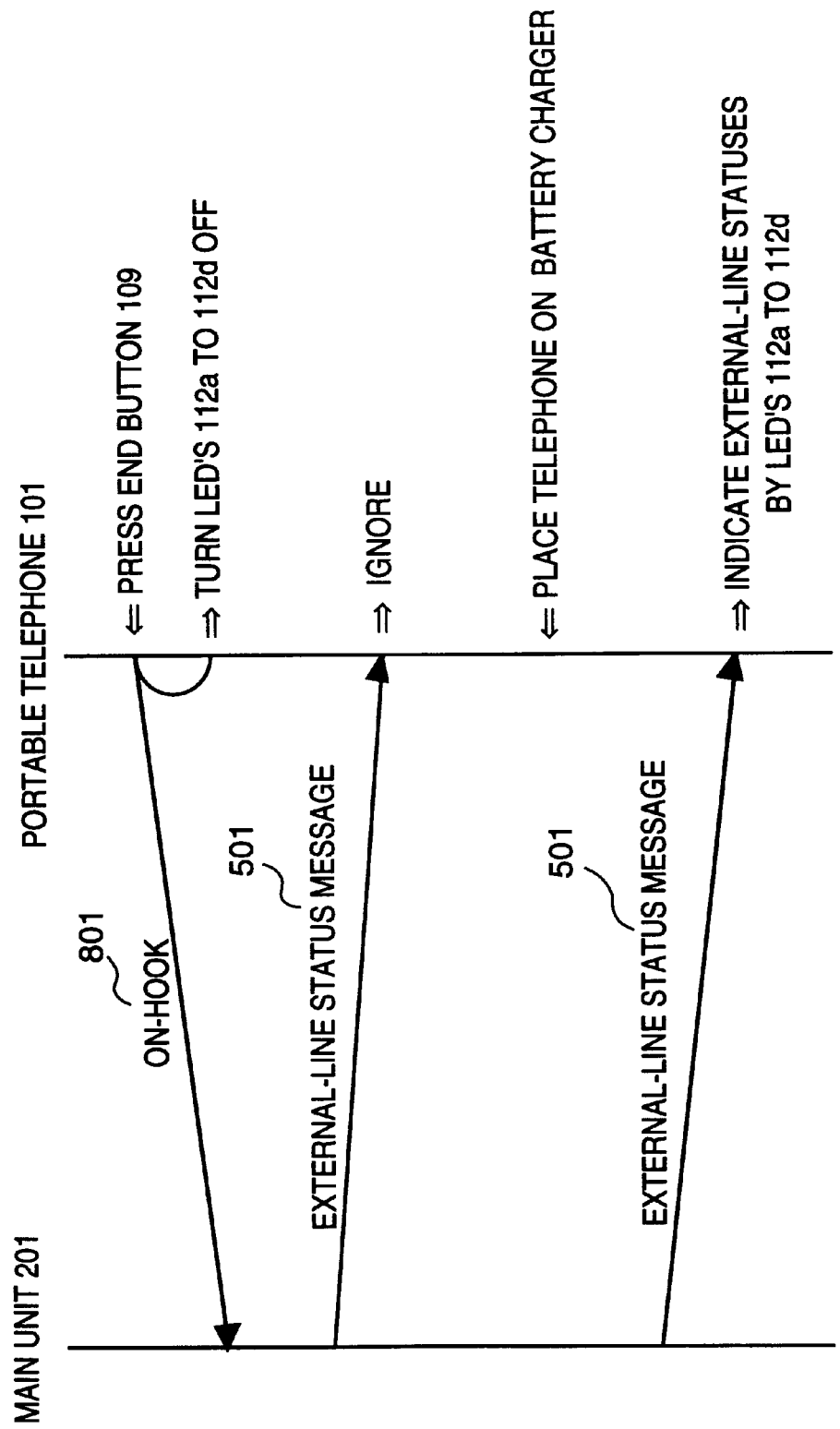
FIG. 15 is a sequence chart showing communication in the conventional key telephone apparatus.

FIG. 14 is a sequence chart showing communication between the main phone 1001 and the portable subphone 901 corresponding to the sequence shown in the above-mentioned case 1, according to the second embodiment.

In this embodiment, at the portable subphone 901, when the mode changes from the external-line status no-indication mode where the external-line LED 912 is turned off, to the external-line status indication mode, the external-line status is immediately indicated by turning on the external-line LED 912. As a result, in the external-line indication mode, a user of the subphone 901 can recognize that the main phone is using the external line or not.

Note that in the second embodiment, a cordless telephone to which two or more portable subphones are connected may attain similar advantages as that of the first embodiment, by practically performing the above display control.

Note that the present invention is applicable not only to a telephone apparatus but other wireless communication apparatuses.

In this manner, even though the external-line status is notified at the external-line no-indication mode, the user can recognize the external-line status immediately after the mode changes to the external-line status indication mode.

The present invention can be applied to a system constituted by a plurality of devices or to an apparatus comprising a single device.

Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

The present invention is not limited to the above embodiments and various changes and modifications can be made within the spirit and scope of the present invention. Therefore, to apprise the public of the scope of the present invention, the following claims are made.

What is claimed is:

1. A wireless communication apparatus which performs wireless communication with a fixed device to which a plurality of external lines are connected, comprising:

reception means for receiving a wireless signal indicative of status of the plurality of external lines, the wireless signal being transmitted corresponding to a timing when status of at least one external line changes;

memory means for storing the status of the plurality of external lines based on the wireless signal received by said reception means;

indication means for indicating the status of the plurality of external lines in an indication mode of the status; and control means for, when a no-indication mode in which the status is not indicated changes to the indication mode, controlling said indication means so as to indicate the status of the plurality of external lines stored in said memory means in a case where the no-indication mode is set when the wireless signal is received.

2. The apparatus according to claim 1, wherein said fixed device comprises a main unit accommodating the plurality of external lines and a connection unit connected to an extension of the main unit, for performing wireless communication with said wireless communication apparatus.

3. The apparatus according to claim 1, wherein said memory means stores the status of the plurality external line based on the wireless signal received by said reception means even said apparatus is in the no-indication mode.

4. A wireless communication apparatus having a fixed unit to which a plurality of external lines are connected and a portable unit which performs wireless communication with the fixed unit, wherein said fixed unit comprises transmission means for transmitting a wireless signal indicative of status of the plurality of external lines corresponding to a timing when status of at least one external line changes, and wherein said portable unit comprises:
reception means for receiving the wireless signal transmitted by said transmission means;
memory means for storing the status of the plurality of external lines based on the wireless signal received by said reception means;
indication means for indicating the status of the plurality of external lines in an indication mode of the status; and control means for, when a no-indication mode in which the status is not indicated changes to the indication mode, controlling said indication means so as to indicate the status of the plurality of external lines stored in said memory means in a case where the no-indication mode is set when the wireless signal is received.

5. The apparatus according to claim 4, wherein said fixed unit comprises a main unit accommodating the plurality external line and a connection unit connected to an extension of the main unit, for performing wireless communication with said portable unit.

6. The apparatus according to claim 4, wherein said memory means stores the status of the plurality external lines based on the wireless signal received by said reception means when said apparatus is in the no-indication mode.

7. An indication control method for a wireless communication apparatus which performs wireless communication with a fixed unit to which a plurality of external lines are connected, comprising the steps of:

receiving a wireless signal indicative of status of the plurality of external lines from the fixed unit, the wireless signal being transmitted corresponding to a timing when status of at least one external line changes;

storing the status of the plurality of external lines based on the wireless signal received at said reception step;

controlling an indication device to indicate the status of the plurality of external lines in an indication mode; and controlling the indication device to indicate the status of the plurality of external lines stored at said storing step, when a no-indication mode in which the status of the plurality of external lines are not indicated by the indication device changes to the indication mode, in a case where the no-indication mode is set when the wireless signal is received.

8. The method according to claim 7, wherein the wireless signal is received from the fixed unit said fixed unit comprising a main unit accommodating the plurality of external lines and a connection unit connected to an extension of the main unit, for performing wireless communication with said wireless communication apparatus.

9. The method according to claim 7, wherein even in the no-indication mode, the status of the plurality of external lines is stored at said storage step based on the wireless signal received at said reception step.

10. An indication method for indicating status of a plurality of telephone lines for a communication apparatus which performs communication via a connection unit to which the plurality of telephone lines are connected, comprising the steps of:

receiving a signal indicative of status of the plurality of telephone lines, the signal being transmitted from the connection unit corresponding to a timing when status of at least one telephone line changes;

storing the status of the plurality of telephone lines based on the signal received at said reception step;

indicating the status of the plurality of telephone lines in an indication mode; and indicating the status of the plurality of telephone lines stored at said storing step, when a no-indication mode in which the status of the plurality of telephone lines are not indicated changes to the indication mode, in a case where the no-indication mode is set when the signal is received.

11. The method according to claim 10, wherein the connection unit comprises a main unit accommodating the plurality of telephone lines and a connection unit connected to an extension of the main unit, for performing wireless communication with the communication apparatus.

12. The method according to claim 10, wherein, even in the no-indication mode, the status of the telephone line is stored at said storage step based on the signal received at said reception step.

13. The method according to claim 10, wherein the no-indication mode is changed to the indication mode in response to battery charge.

14. The method according to claim 10, wherein the no-indication mode is changed to the indication mode in response to an incoming call.

15. The apparatus according to claim 1, wherein the no-indication mode is changed to the indication mode in response to battery charge.

16. The apparatus according to claim 1, wherein the no-indication mode is changed to the indication mode in response to an incoming call.

17. The apparatus according to claim 4, wherein the no-indication mode is changed to the indication mode in response to battery charge.

18. The apparatus according to claim 4, wherein the no-indication mode is changed to the indication mode in response to an incoming call.

19. The method according to claim 7, wherein the no-indication mode is changed to the indication mode in response to battery charge.

20. The method according to claim 7, wherein the no-indication mode is changed to the indication mode in response to an incoming call.

21. A wireless communication apparatus which performs wireless communication with a fixed device to which an external line is connected, comprising:

reception means for receiving a wireless signal indicative of status of the external line;

memory means for storing the status of the external line based on the wireless signal received by said reception means; and indication means for indicating, while battery charge occurs, the status of the external line stored in said memory means before the battery charge began.

22. The apparatus according to claim 21, wherein said fixed device comprises a main unit accommodating the external line and a connection unit connected to an extension of the main unit, for performing wireless communication with said wireless communication apparatus.

23. The apparatus according to claim 21, wherein said memory means stores the status of the external line based on the wireless signal received by said reception means before the battery charge.

24. A wireless communication apparatus having a fixed unit to which an external line is connected and a portable unit which performs wireless communication with the fixed unit, wherein said fixed unit comprises transmission means for transmitting a wireless signal indicative of status of external line, and wherein said portable unit comprises reception means for receiving the wireless signal transmitted by said transmission means;

memory means for storing the status of the external line based on the wireless signal received by said reception means; and indication means for indicating, while battery charge occurs, the status of the external line stored in said memory means before the battery charge began.

25. The apparatus according to claim 24, wherein said fixed unit comprises a main unit accommodating the external line and a connection unit connected to an extension of the main unit, for performing wireless communication with said wireless communication apparatus.

26. The apparatus according to claim 24, wherein said memory means stores the status of the external line based on the wireless signal received by said reception means before the battery charge.

27. An indication control method for a wireless communication apparatus which performs wireless communication with a fixed device to which an external line is connected, comprising the steps of:

receiving a wireless signal indicative of status of the external line;

storing the status of the external line based on the wireless signal received at said reception step; and indicating, while battery charge occurs, the status of the external line stored at said storing step before the battery charge began.

28. The method according to claim 27, wherein the wireless signal is received from the fixed device comprising a main unit accommodating the external line and a connection unit connected to an extension of the main unit, for performing wireless communication with said wireless communication apparatus.

29. The method according to claim 27, wherein the status of the external line is stored at said storage step based on the wireless signal received at said reception step before the battery charge.

30. A communication apparatus which performs communication with a connection device to which a plurality of external lines are connected, comprising:

reception means for receiving a signal indicative of status of the plurality of external lines;

memory means for storing the status of the plurality of external lines based on the signal received by said reception means; and indication means, having an indication mode and a no-indication mode, for indicating the status of the plurality of external lines stored in said memory means in the indication mode, wherein the status of the plurality of external lines based on the signal received by said reception means is not indicated in the no-indication mode, and the no-indication mode is changed to the indication mode in accordance with an incoming call which is other than the signal a indicative of status of the plurality of external lines.

31. The apparatus according to claim 30, wherein said connection device comprises a main unit accommodating the plurality external lines and a connection unit connected to an extension of the main unit, for performing wireless communication with said communication apparatus.

32. The apparatus according to claim 30, wherein said memory means stores the status of the external line based on the signal received by said reception means before the incoming call.

33. A wireless communication apparatus having a fixed unit to which a plurality of external lines are connected and a portable unit which performs wireless communication with the fixed unit, wherein said fixed unit comprises transmission means for transmitting a wireless signal indicative of status of the plurality of external lines, and wherein said portable unit comprises, reception means for receiving the wireless signal transmitted by said transmission means;

memory means for storing the status of the plurality of external lines based on the wireless signal received by said reception means; and indication means, having an indication mode and a no-indication mode, for indicating the status of the plurality of external lines stored in said memory means in the indication mode, wherein the status of the plurality of external lines based on the signal received by said reception means is not indicated in the no-indication mode, and the no-indication mode is changed to the indication mode in accordance with an incoming call which is other than the wireless signal indicative of status of the plurality of external lines.

34. The apparatus according to claim 33, wherein said fixed unit comprises a main unit accommodating the plurality of external lines and a connection unit connected to an extension of the main unit, for performing wireless communication with said wireless communication apparatus.

35. The apparatus according to claim 33, wherein said memory means stores the status of the plurality of external lines based on the wireless signal received by said reception means before the incoming call.

36. An indication control method for a communication apparatus which performs communication with a connection device to which a plurality of external lines are connected, comprising the steps of:

receiving a signal indicative of status of the plurality of external lines;

storing the status of the plurality of external lines based on the signal received at said reception step;

indicating, in an indication mode, the status of the plurality of external lines stored in said storing step, wherein the status of the plurality of external lines based on the signal received in said reception step is not indicated in a no-indication mode; and changing the no-indication mode to the indication mode in accordance with an incoming call which is other than the signal indicative of status of the plurality of external lines.

37. The method according to claim 36, wherein the signal is received from the fixed device comprising a main unit accommodating the plurality of external lines and a connection unit connected to an extension of the main unit, for performing wireless communication with said communication apparatus.

38. The method according to claim 36, wherein the status for the plurality of external lines is stored at said storage step based on the signal received at said reception step before the incoming call.

39. A wireless communication apparatus, comprising:

reception means for receiving a wireless signal representing display information;

memory means for storing the display information based on the wireless signal received by said reception means; and display means for displaying, while battery charge occurs, the display information stored in said memory means before the battery charge began.

40. The apparatus according to claim 39, wherein said wireless communication apparatus performs wireless communication with a fixed device comprising a main unit accommodating the external line and a connection unit connected to an extension of the main unit.

41. The apparatus according to claim 39, wherein said memory means stores the display information based on the wireless signal received by said reception means before the battery charge.

42. The apparatus according to claim 39, wherein the display information indicates status of the external line.

43. A wireless communication apparatus having a fixed unit to which an external line is connected and portable unit which performs wireless communication with the fixed unit, wherein said fixed unit comprises transmission means for transmitting a wireless signal representing display information, and
wherein said portable unit comprising,
reception means for receiving the wireless signal;
memory means for storing the display information based on the wireless signal received by said reception means; and
display means for displaying, while battery charge occurs, the display information stored in said memory means before the battery charge began.

44. The apparatus according to claim 43, wherein said fixed unit comprises a main unit accommodating the external line and a connection unit connected to an extension of the main unit, for performing wireless communication with said wireless communication apparatus.

45. The apparatus according to claim 43, wherein said memory means stores the display information based on the wireless signal received by said reception means before the battery charge.

46. The apparatus according to claim 43, wherein the display information indicates status of the external line.

47. An indication control method for a wireless communication apparatus, comprising steps of:
receiving a wireless signal representing display information;
storing the display information based on the wireless signal received at said reception step; and
displaying, while battery charge occurs, the display information stored at said memory step before the battery charge began.

48. The method according to claim 47, wherein the wireless signal is received from the fixed device comprising a main unit accommodating the external line and a connection unit connected to an extension of the main unit.

49. The method according to claim 47, wherein the display information is stored at said storage step based on the wireless signal received at said reception step before the battery charge.

50. The method according to claim 47, wherein the display information indicates status of the external line.

51. A communication apparatus, comprising:
reception means for receiving a signal representing display information;
memory means for storing the display information based on the signal received by said reception means; and
display means, having a display mode and a non-display mode, for displaying the display information stored in said memory means in the display mode,
wherein the display information based on the signal received by said reception means is not displayed in the non-display mode even if the signal is received by said reception means, and
the non-display mode is changed to the display mode in accordance with an incoming call which is other than the signal representing display information.

52. The apparatus according to claim 51, wherein said communication apparatus performs wireless communication with a connection device comprising a main unit accommodating the external line and a connection unit connected to an extension of the main unit.

53. The apparatus according to claim 51, wherein said memory means stores the display information based on the signal received by said reception means before the incoming call.

54. The apparatus according to claim 51, wherein the display information indicates status of the external line.

55. A wireless communication apparatus having a fixed unit to which an external line is connected and a portable unit which performs wireless communication with the fixed unit,
wherein said fixed unit comprises transmission means for transmitting a wireless signal representing display information, and
wherein said portable unit comprises:
reception means for receiving the wireless signal;
memory means for storing the display information based on the wireless signal received by said reception means; and
display means, having a display mode and a non-display mode, for displaying the display information stored in said memory means in the display mode,
wherein the display information based on the wireless signal received by said reception means is not displayed in the non-display mode even if the signal is received by said reception means, and
the non-display mode is changed to the display mode in accordance with an incoming call which is other than the signal representing display information.

56. The apparatus according to claim 55, wherein said fixed unit comprises a main unit accommodating the external line and a connection unit connected to an extension of the main unit, for performing wireless communication with said wireless communication apparatus.

57. The apparatus according to claim 55, wherein said memory means stores the display information based on the wireless signal received by said reception means before the incoming call.

58. The apparatus according to claim 55, wherein the display information indicates status of the plurality of external lines.

59. An indication control method for a communication apparatus, comprising the steps of:
receiving a signal representing display information;
storing the display information based on the signal received at said reception step;
displaying, in a display mode, the display information stored in said storing step, wherein the display information based on the signal received in said reception step is not displayed in a non-display mode even if the signal is received in said reception step; and
changing the non-display mode to the display mode in accordance with an incoming call which is other than the signal representing display information.

60. The method according to claim 59, wherein the signal is received from the fixed device comprising a main unit accommodating the external line and a connection unit connected to an extension of the main unit.

61. The method according to claim 59, wherein the display information is stored at said storage step based on the signal received at said reception step before the incoming call.

62. The method according to claim 59, wherein the display information indicates status of the external line.

63. The apparatus according to claim 1, wherein said indication means does not indicate the status of the plurality of external lines in the no-indication mode even if the wireless signal is received.

64. The apparatus according to claim 4, wherein said indication means does not indicate the status of the plurality of external lines in the no-indication mode even if the wireless signal is received.

65. The method according to claim 7, wherein said indication device does not indicate the status of the plurality of external lines in the no-indication mode even if the wireless signal is received.

66. The method according to claim 10, wherein the status of the plurality of external lines are not indicated in the no-indication mode even if the wireless signal is received.

67. The apparatus according to claim 30, wherein said indication means does not indicate the status of the plurality of external lines in the no-indication mode even if the wireless signal is received.

68. The apparatus according to claim 33, wherein said indication means does not indicate the status of the plurality of external lines in the no-indication mode even if the wireless signal is received.

69. The method according to claim 36, wherein the status of the plurality of external lines are not indicated in the no-indication mode even if the wireless signal is received.

* * * * *

UNITED STATES PATENT AND TRADEMARK OFFICE
CERTIFICATE OF CORRECTION

PATENT NO. : 6,055,445
DATED : April 25, 2000
INVENTOR(S) : Shigeru Hiroki

It is certified that error appears in the above-identified patent and that said Letters Patent is hereby corrected as shown below:

<u>Column 8,</u>
Line 48, "plurality external line" should read -- plurality of external lines --.

<u>Column 9,</u>
Lines 9-10, "plurality external line" should read -- plurality of external lines --.
Lines 14-15, "plurality external lines" should read -- plurality of external lines --.

<u>Column 10,</u>
Line 7, "status of the telephone line" should read -- status of the plurality of telephone lines --.

<u>Column 11,</u>
Line 50, "signal a indicative" should read -- signal indicative --.
Line 54, "plurality external lines" should read -- plurality of external lines --.

<u>Column 13,</u>
Line 10, "and portable" should read -- and a portable --.

<u>Column 14,</u>
Lines 46-47, "status of the plurality of external lines." should read -- status of the external line. --.

Signed and Sealed this

Fifteenth Day of October, 2002

*Attest:*

JAMES E. ROGAN
*Director of the United States Patent and Trademark Office*

*Attesting Officer*